United States Patent [19]

Hirano et al.

[11] Patent Number: 4,552,601
[45] Date of Patent: Nov. 12, 1985

[54] METHOD OF FOAMING A FOAMABLE COMPOSITION IN A SEALED SACK

[75] Inventors: Yutaka Hirano; Hiroki Kawai, both of Tokyo, Japan

[73] Assignees: Sumitomo Corporation; Nikken Sekkei Ltd., both of Osaka, Japan

[21] Appl. No.: 478,700

[22] Filed: Mar. 24, 1983

[30] Foreign Application Priority Data

Mar. 24, 1982 [JP] Japan ................................. 57-46883
Mar. 24, 1982 [JP] Japan ................................. 57-46884

[51] Int. Cl.⁴ ........................... C09J 5/02; B32B 5/20; B32B 31/14
[52] U.S. Cl. ................................. 156/79; 156/308.4; 428/71; 428/76
[58] Field of Search ...................... 428/68, 69, 71, 76, 428/317.5; 156/79, 308.4

[56]  References Cited

U.S. PATENT DOCUMENTS

| | | | |
|---|---|---|---|
| 3,166,831 | 1/1965 | Keith | 156/79 |
| 3,294,602 | 12/1966 | Francis et al. | 428/316.6 |
| 3,389,195 | 6/1968 | Gianakos et al. | 156/79 |
| 3,419,134 | 12/1968 | Fitts | 206/522 |
| 3,619,310 | 11/1971 | Clarke | 156/79 |
| 3,654,057 | 4/1972 | Olevitch | 428/69 |
| 3,795,722 | 3/1974 | Sassaman | 428/71 |
| 4,273,827 | 6/1981 | Sweeney et al. | 428/317.5 |

*Primary Examiner*—William J. Van Balen
*Attorney, Agent, or Firm*—Body, Vickers & Daniels

[57] ABSTRACT

The invention concerns a construction material, which is produced by pouring a foamable composition into a hermetically sealed sack consisting of thin sheets and causing foaming of the poured foamable composition, the hermetically sealed sack being elastically or plastically deformed by the pressure produced with the foaming of the foamable composition and held in a predetermined shape with the solidification of the foamable composition after the foaming thereof, and also a method of manufacturing the same construction material. The construction material is light in weight and has satisfactory mechanical strength and rigidity.

6 Claims, 6 Drawing Figures

METHOD OF FOAMING A FOAMABLE COMPOSITION IN A SEALED SACK

BACKGROUND OF THE INVENTION

1. Field of the Invention

This invention relates to a construction material, which is large in size, has a panel-like shape and is used as roofing materials and wall materials, and a method of manufacturing the same.

2. Description of the Prior Art

Where heavy weight panels such as precast concrete panels are used as roofing materials on a large span frame or like structure where supports are spaced apart large distances, the panel and support members must have high mechanical strength and the mounting structure is complicated, thus leading to high cost.

On the other hand, in case of light weight panels such as sandwich panels, their manufacture is complicated, leading to high cost. Besides, their durability, rigidity and reliability are inferior.

SUMMARY OF THE INVENTION

An object of the invention is to provide a construction material, which has a large size and a panel-like shape and is used as roofing materials and wall materials, and also a method of manufacturing the same.

Another object of the invention is to provide a construction material, which is light in weight, has high mechanical strength and rigidity and can be used as roofing materials for large span frames or structure to reduce load of support members.

A further object of the invention is to provide a construction material, which is simple in construction and can be manufactured as a large-size panel even at the site of construction, and a method of manufacturing the same.

BRIEF DESCRIPTION OF THE DRAWINGS

The above and further objects, features and advantages of the construction material and method of manufacturing the same according to the invention will become more apparent from the following description when the same is read with reference to the accompanying drawings, in which.

DETAILED DESCRIPTION OF PREFERRED EMBODIMENTS

The construction material according to the invention is featured in that it is produced by pouring a foamable composition into a hermetically sealed sack consisting of thin sheets and causing foaming of the foamable composition in the sack to cause the sack to be elastically or plastically deformed by the pressure of foaming and obtain a predetermined shape with the solidification of the composition after the foaming.

The thin sheets that constitute the sack may be metal sheets, e.g., steel sheets, stainless steel sheets and aluminum sheets, or synthetic resin sheets, e.g., polyvinyl chloride resin sheets and polyethylene resin sheets, or fabrics coated with resins. They should not pass the non-solidified foamable composition through them and also should have flexibility.

The hermetically sealed sack is formed by overlapping two thin sheets as mentioned above and securing together their edges, with or without a C shape steel frame or the like interposed between their edges, by means of welding, an adhesive or pressing them together with press dies.

The composition to be poured into and foamed in the sack, should be one, which can have sufficient rigidity after its foaming and solidification. Particularly, it should be one which can produce a sufficient pressure of foaming to cause elastic or plastic deformation of the sack consisting of the thin sheets into a desired shape. Examples of the foamable composition that can be used are foamable polyurethane, foamable phenol resins, foamable urea resins, foamable polystyrene, foamable polyethylene and foamable cement mortar.

Figure 1:
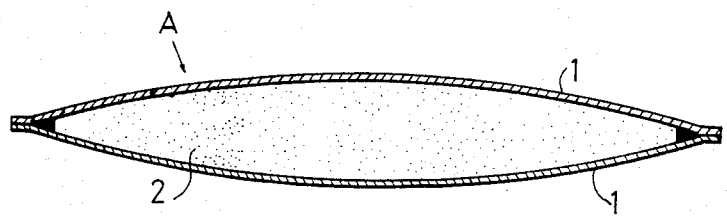
FIG. 1 is a sectional view showing a construction material according to the invention.

FIG. 1 shows a construction material A according to the invention. It comprises a hermetically sealed sack, which is formed by overlapping two thin metal sheets 1 having the same square shape and welding together their edges, and a foamed composition 2 obtained as a result of foaming and solidification of a foamable composition poured into the sack.

Figure 2:
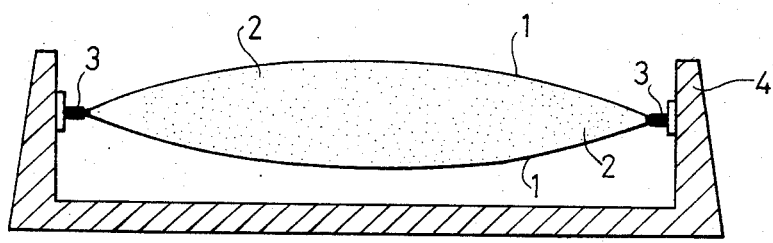
FIG. 2 is a sectional view showing a set-up for manufacturing the construction material of FIG. 1 by securing a sack consisting of thin sheets to a stationary frame and pouring a foamable composition into the sack.

FIG. 2 shows an example of the set-up for fabricating the construction material A. To produce the material A, the sack, which is formed by overlapping two square metal sheets 1 and welding together their edges, is first held in position by securing its edges by clamps 3 to a stationary frame 4. The foamable composition is then poured into the sack and then foamed. As the foamable composition is foamed, the sack, which has its edges secured in position by the clamps 3, experiences a pressure of foaming of the composition. As a result, the two thin sheets constituting the sack are pushed outwards and elastically or plastically deformed into a spherical shape. Thus, with the construction material according to the invention, which is obtained after the foaming and solidification of the foamable material, the outer side of the thin sheets has a shell-like shape, and the tension in the thin sheets is in balance with the internal pressure. The material thus can maintain its shape after the stationary frame 4 is removed, and it has high rigidity and bending strength.

Figure 3:
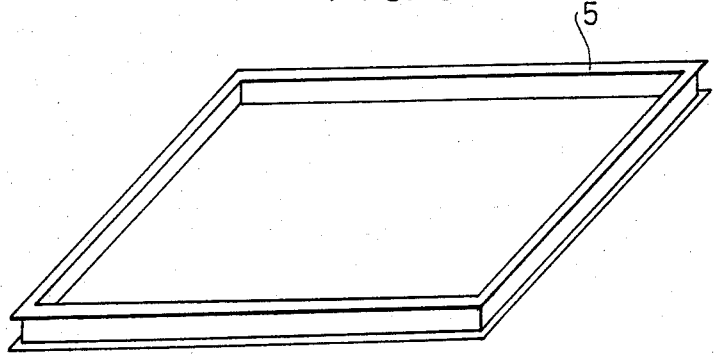
FIG. 3 is a perspective view showing a square stationary frame consisting of C shape steel.
Figure 4:
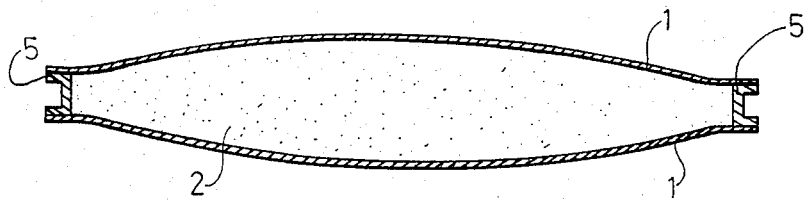
FIG. 4 is a sectional view showing a construction material including the stationary frame of FIG. 3 provided along the edges of the material.

FIG. 4 shows another construction material according to the invention. It is foamed by using a square frame 5 consisting of C shape steel as shown in FIG. 3. To be more specific, the edges of two thin sheets 1 are hermetically secured to the opposite sides of the frame 5 to form a sack. Then, the foamable composition is poured into the sack and then foamed and solidified. In this way, a construction material which includes the frame 5 can be obtained.

Figure 5:
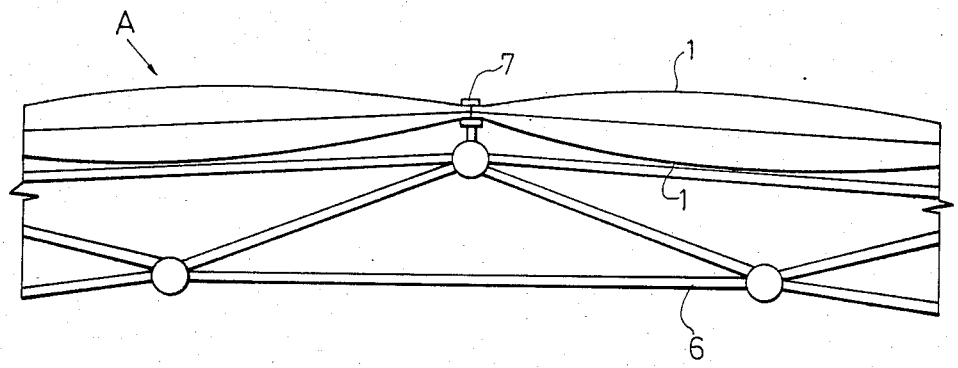
FIG. 5 is a front view showing a large span structure formed by forming construction materials according to the invention in a side-by-side arrangement on top of trusses.

FIG. 5 shows a roof of a large span structure. It consists of a plurality of construction materials A provided in a side-by-side arrangement on top of a roof frame consisting of trusses 6. To produce this roof, a number of hermetically sealed sacks, each of which is formed by overlapping two square or right hexagonal thin steel sheets and welding together their edges, are arranged on top of the roof frame consisting of the trusses 6 with their edges secured by clamps 7 to the trusses 6. The foamable composition is then poured into each sack, and then it is foamed and solidified, thereby causing deformation of the two thin sheets into the shape of a spherical shell. Thus, a roof which consists of a number of shell-like construction materials A arranged on top of the roof frame can be obtained. Alternatively, the construction materials A may be preliminarily formed, and then they may be secured in the side-by-side arrangement to the trusses 5 of the roof frame, thus obtaining the roof. The materials A may be secured either by continuous support or point support to the trusses 6.

The construction material A may have other shapes than the square and hexagonal shapes, for instance circular and triangular shapes. Further, the sack may be formed by overlapping three or more thin sheets instead of two thin sheets. Furthermore, it may include a metal plate as a core member.

Figure 6:
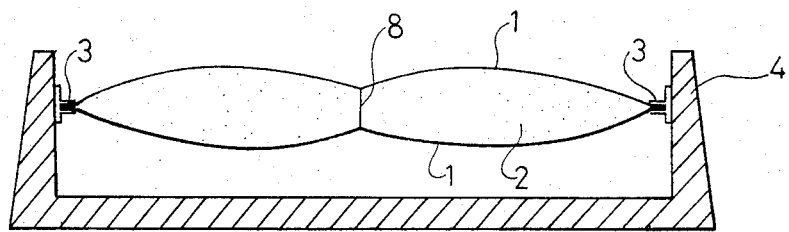
FIG. 6 is a view similar to FIG. 2 but showing a different construction material.

FIG. 6 shows a further example of the construction material A according to the invention. In this material, a partition member 8 is provided between two thin sheets 1 to restrict the distance between the thin sheets 1 when the sheets are deformed.

As a further example, it is possible to use two thin sheets having different moduli of elasticity and thus deformed differentially. In this case, a construction material having an asymmetric shape on the front and rear sides, can be obtained.

As has been described in the foregoing, according to the invention a foamable composition is poured into a sack consisting of thin sheets and foamed in a hermetically sealed state to produce a construction material. Thus, it is possible to obtain a construction material having a desired shape and high rigidity. Particularly, sufficient mechanical strength can be provided with respect to load in the normal direction. Further, the material is light in weight because its inside is constituted by a foamed composition. Furthermore, since the construction material according to the invention can be formed by pouring a foamable composition into a sack, it is simple in construction and can be comparatively readily fabricated, and it is further suited for fabrication at the construction site.

We claim

1. A method of manufacturing a construction material comprising the steps of:

forming a hermetically sealed sack by disposing two thin flat sheets of flexible material in overlying relationship to one another and sealing together the edges of said thin sheets about the peripheries thereof;

providing a foamable composition in said sealed sack;

fixedly supporting said sack horizontally in suspension by said edges and completely about said peripheries thereof for the portions of said sheets between said sealed edges to be unsupported and freely deformable and the said sealed edges to be fixedly secured and immovably retained in place in their supported contour position; and causing said foamable composition to be foamed and solidified while said sack is maintained so supported in suspension, whereby said unsupported portions of said thin sheets of said hermetically sealed sack are elastically deformed, without any external restraint thereof, arcuately outwardly relative to one another transverse to the plane of said supported sealed edges and into shallow spherically dished from by the pressure produced by the foaming of said foamable composition while the said sealed edges are maintained flat and in their said contour position in the said plane by the said fixedly supporting thereof.

2. The method according to claim 1, wherein said sheets are metal sheets and said edges are sealed together by welding.

3. The method according to claim 1, wherein the said edges are sealed together by hermetically securing said edges to an intermediate C shape steel frame corresponding in contour to and interposed between said edges.

4. The method according to claim 1, wherein a plurality of said hermetically sealed sacks are secured at their said sealed edges to a support frame in adjoining relation to one another with the sealed edges of adjoining said sacks clamped in edgewise abutting relation to each other, and the said secured sacks then each provided with a said foamable composition therein and the said foamable composition in each of said sacks then foamed and solidified while the sacks remain clamped in place to said support frame.

5. The method according to claim 1, wherein a transverse partition is provided between and sealed to said sheets across medial regions thereof to restrict the separation distance between the said sheets at said regions on their outward deformation by the foaming of said foamable composition.

6. The method according to claim 1, wherein the said sheets have different moduli of elasticity so as to deform differentially into asymmetric relative shapes on outward deformation thereof by the foaming of said foamable composition.

* * * * *

UNITED STATES PATENT AND TRADEMARK OFFICE
CERTIFICATE OF CORRECTION

PATENT NO. : 4,552,601
DATED : November 12, 1985
INVENTOR(S) : Yutaka Hirano, Hiroki Kawai It is certified that error appears in the above-identified patent and that said Letters Patent are hereby corrected as shown below:

On the title page, in the title in [54] "FOAMING" should read --- FORMING ---; Column 1, line 2, in the title, "FOAMING" should read --- FORMING ---.

Signed and Sealed this

Sixth Day of May 1986

[SEAL]

Attest:

DONALD J. QUIGG

Attesting Officer

Commissioner of Patents and Trademarks